(12) United States Patent
Ellison et al.

(10) Patent No.: US 6,670,028 B2
(45) Date of Patent: Dec. 30, 2003

(54) MOLDED ARTICLE AND PROCESS FOR PREPARING SAME

(75) Inventors: Thomas M. Ellison, Fort Mill, SC (US); Stephen P. McCarthy, Tyngsboro, MA (US); Arthur K. Delusky, Detroit, MI (US); Qing Guan, Lowell, MA (US)

(73) Assignee: University of Massachusetts, Boston, MA (US)

( * ) Notice: Subject to any disclaimer, the term of this patent is extended or adjusted under 35 U.S.C. 154(b) by 4 days.

(21) Appl. No.: 09/881,751

(22) Filed: Jun. 15, 2001

(65) Prior Publication Data

US 2001/0041254 A1 Nov. 15, 2001

Related U.S. Application Data

(63) Continuation of application No. 09/320,525, filed on May 26, 1999, now abandoned.

(51) Int. Cl.[7] .................. B32B 33/00; B32B 27/00
(52) U.S. Cl. .................. 428/300.7; 428/359; 428/361
(58) Field of Search ................... 428/334, 411.1, 428/323, 327, 328, 359, 361

(56) References Cited

U.S. PATENT DOCUMENTS

| | | |
|---|---|---|
| 4,840,832 A | 6/1989 | Weinle et al. |
| 5,238,725 A | 8/1993 | Effing et al. |
| 5,518,786 A * | 5/1996 | Johnson et al. ........... 428/40.6 |
| 5,709,925 A | 1/1998 | Spengler et al. |

* cited by examiner

Primary Examiner—Stevan A. Resan
(74) Attorney, Agent, or Firm—Bachman & LaPointe, P.C.

(57) ABSTRACT

A molded article including a plastic layer and an outer film over the plastic layer forming a composite laminate with the plastic layer and a process for preparing same. The outer film has an inner surface adjacent and bonded to the plastic layer and an outer surface opposed to the inner surface. The molded article also includes a reinforcing material adhered to the inner surface of the outer film layer and preferably at least partly embedded in the inner surface of the outer film layer.

3 Claims, 3 Drawing Sheets

MOLDED ARTICLE AND PROCESS FOR PREPARING SAME

This is a Continuation of application Ser. No. 09/320,525, filed May 26, 1999, now abandoned.

BACKGROUND OF THE INVENTION

In accordance with U.S. Pat. No. 5,401,457 for PROCESS FOR FORMING A COLOR COATED ARTICLE, By Emery I. Valyi, Patented Mar. 28, 1995, a process is provided for forming a color coated article. In accordance with the procedure of the '457 patent, a film is placed substantially flat over a mold cavity and deformed by a core half and by molten plastic entering through a sprue. However, the procedure of the '457 patent is difficult to control, particularly when molding parts with large surfaces and sharply varying curvatures. The difficulties increase when the plastic is pressure molded at high enough temperatures to reduce the film strength substantially, as is the case with conventional injection molding procedures.

In accordance with U.S. patent application Ser. No. 09/130,864, filed Aug. 7, 1998, by Emery I. Valyi et al., now U.S. Pat. No. 6,132,699 a color coated article is prepared by depositing molten plastic on a film and forming the film-molten plastic combination in a mold cavity. This procedure and the resultant article effectively and efficiently forms a color coated article. However, it would be particularly desirable to further improve the resultant article particularly degradation of the film, particularly thinning of the color layer after forming.

Accordingly, it is a principal objective of the present invention to provide an improved plastic-film laminate which may be conveniently and expeditiously obtained.

It is a still further object of the present invention to provide an improved laminate as aforesaid which reinforces the film without loss of properties therein and without jeopardizing the ease and convenience of final article preparation.

Further objects and advantages of the present invention will appear hereinbelow.

SUMMARY OF THE INVENTION

In accordance with the present invention, the foregoing objects and advantages are readily obtained.

The molded article of the present invention comprises: a plastic layer; an outer film layer over said plastic layer and forming a composite laminate therewith, said outer film layer having an inner surface adjacent and bonded to said plastic layer and an outer surface opposed to said inner surface; a reinforcing material adhered to and preferably at least partly embedded in the inner surface of the outer film layer; and a colored, decorative layer with color uniformity on the outer surface of said outer film layer. The reinforcing material may desirably be metal, as metal mesh or metal fabric, plastic, carbon fiber, fiberglass, textiles (natural or synthetic), or combinations of these.

The process of the present invention comprises: providing a composite laminate having an outer film layer with an inner surface and an outer surface opposed to said inner surface, an inner plastic layer bonded to said inner surface, and a colored, decorative layer on said outer surface; reinforcing the inner surface of the outer film layer with a reinforcing material between the outer film layer and the inner plastic layer; and molding a plastic article from said reinforced composite laminate, wherein the colored, decorative layer maintains color uniformity in the molded article.

In the preferred embodiment, the colored layer has a thickness of less than 0.01 inch and desirably from 0.001–0.006 inch. It is a particular advantage of the present invention that the resultant molded article has a color change after molding of less than 2 McAdam units, particularly in view of the thin colored layer and the molding operation.

Further features of the present invention will appear from the following disclosure.

BRIEF DESCRIPTION OF THE DRAWINGS

The present invention will be more readily understandable from the following illustrative drawings, wherein.

DETAILED DESCRIPTION OF PREFERRED EMBODIMENTS

Figure 1:
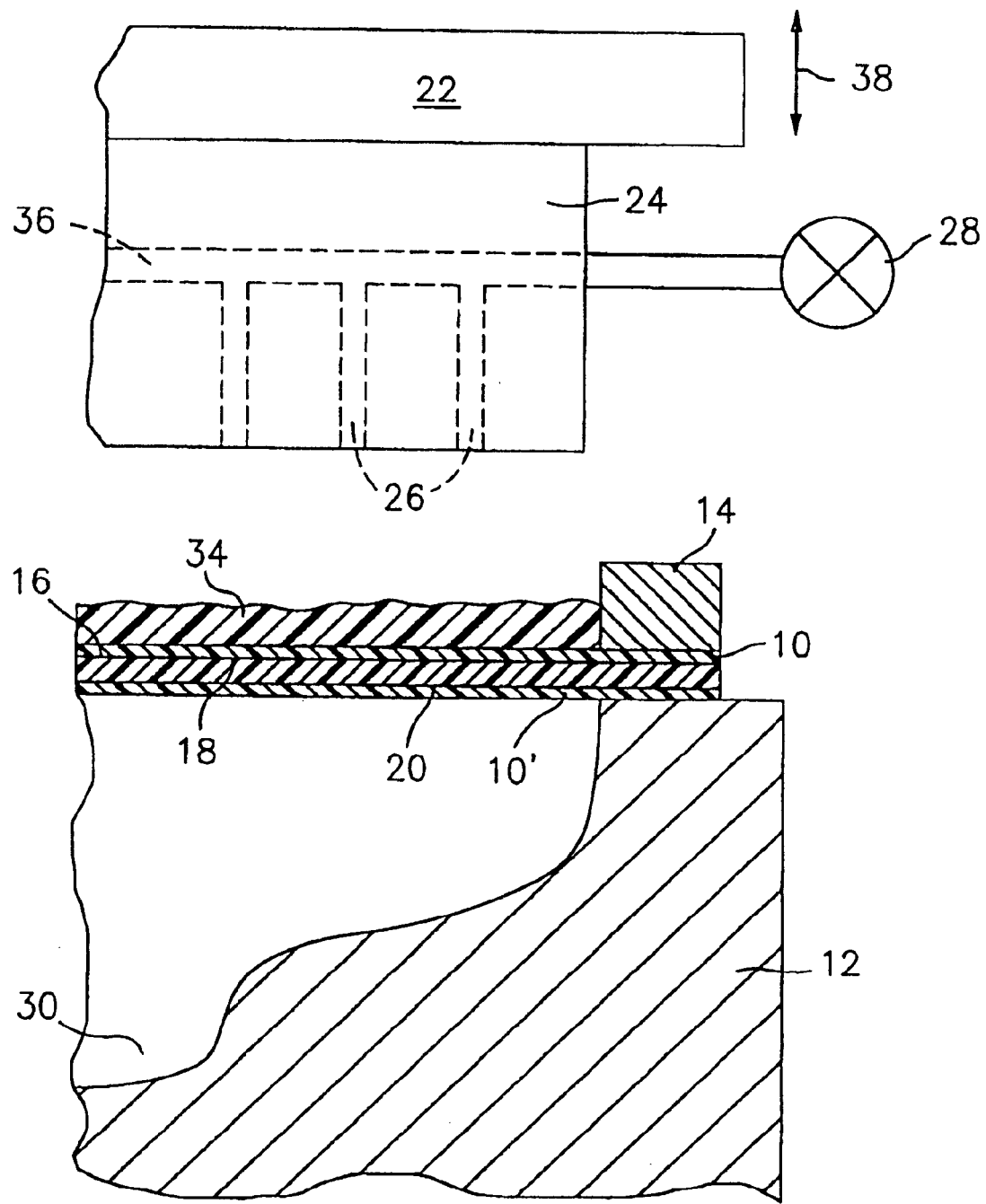
FIG. 1 is a partly schematic view showing one embodiment for the preparation of the molded article of the present invention.

In accordance with the illustrative embodiment of FIG. 1, film or blank 10 is held over mold 12 by clamping frame 14, with reinforcing material 16 adhered to or at least partly embedded in the inner face 18 of film 10. Outer face 20 of film 10 is opposed to the inner face and forms the external surface of the film or blank 10 in the embodiment of FIG. 1. Colored, decorative layer 10' is on the outer face or outer surface 20 of film 10. Platen 22 is shown with a forming mandrel 24, which is desirably a solid metal mandrel but which may also for example be an elastomeric mandrel, and which may contain air slots 26 and pressure control means 28 connected thereto. Mold 12 includes mold cavity 30 therein which forms the shape of the desired molded article 32 shown in FIG. 2. Naturally, any desired mold cavity shape may be used. In addition, if desired, one could texture the mold surface to have a desired textured finish on the final product. Hot plastic 34 is injected or deposited on the film 10 reinforcing material 16 combination by any desired means, as from an extruder, to form the layered structure shown in FIG. 1. As shown in the embodiment of FIG. 1, slots 26 if used intersect a manifold slot 36 which is connected to a source of fluid pressure.

Figure 2:
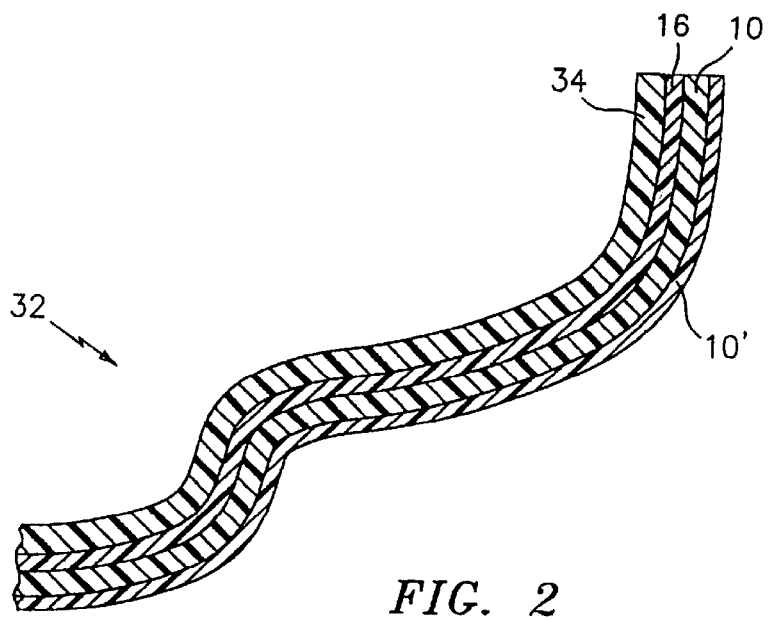
FIG. 2 is a partial sectional view showing the article prepared in FIG. 1.

In operation, the mandrel 24 enters the clamping frame 14. Pressure air is applied to slots 26 if used expanding the slots into passages. Thereby, pressure is applied to the deposited plastic 34 and the colored layer 10'—film 10—reinforcing material combination. Pressure may also be present in mold cavity to support the layers over the mold before molding, as by air slots in mold 12 (not shown), which should be controllably released at the same time as the layers are formed into the mold cavity. This will result in forming the layers by blow molding into the molded article shown in FIG. 2. The mandrel 24 moves simultaneously downward into the mold cavity 30 in the direction of arrow 38. As the plastic and film reach the mold surface, the mandrel continues and conforms to the surface of the plastic away from the film 10—reinforcing material layers, and continued pressure by the platen results in forming of the final desired article, as shown in FIG. 2. The mandrel and mold are preferably cooled. If a solid mandrel is used, it should conform to the desired shape of the final article. If desired, the colored layer—film-reinforcing material combination may first be conformed to the shape of mold cavity 30, mandrel 24 seated in mold 12 and plastic material 34 injected against the film-reinforcing material to form the final article.

The resultant molded article 32 includes the outer film layer 10, outer colored layer 10', inner reinforcing layer 16 which is adhered to and/or at least partly embedded in the outer film layer, and the inner plastic layer 34. The resultant molded article 32 has the desired shaped configuration determined by the shape of the mold cavity. Moreover, advantageously, despite the forming operation the colored layer is characterized by color uniformity and a color coated article is formed in a simple and convenient manner.

The blank or film 10 is plastic, and any desired plastic material may be used for the blank 10 or molten plastic material 34, for example, polyolefins, polyurethanes, acrylonitrile butadiene styrene (ABS), polyvinyl chloride, polystyrene, polycarbonates, polyesters, etc., and desirable blends of the foregoing. The colored layer may be directly coated on the film or blank or may be a separate layer as a colored plastic layer as above. Layers 10 and 34 may be the same or different materials. If the same materials are used, one can obtain melt bonding between the materials, as through openings of the reinforcing material. If different materials are used, one can achieve a mechanical bond into fibers of the reinforcing material, or adhesive bonding can be used. The layers may be cut or stamped from a web and a supply having the size and shape to fit over or into the mold cavity maintained adjacent the mold for transfer to the mold as needed and the colored layer coated on the film. The depth of color on the colored layer may be varied to at least partially accommodate thinning during processing and to at least partially adjust the color depth to the amount of deformation any given portion will undergo. Thus, for example, thicker paint coatings may be applied to selective blank or film locations that are to obtain greater deformation during processing in order to at least partially obtain uniformity of color in the final molded product. This is difficult to achieve, however, and may not be entirely successful. The present invention, however, effectively minimizes color thinning. The blank or film may, for example, be gravure printed with a thin color layer.

Thus, in accordance with the present invention, a reinforcing material 16 is adhered to and/or at least partly embedded in the inner surface of the film or blank in order to eliminate or significantly minimize the color thinning. Desirably, the reinforcing material is a textile material, synthetic or natural. However, one could readily use a fiberglass mat or scrim or a random fiberglass material, or metal or additional plastic. The metal should be a metal mesh or metal which will elongate or form under pressure. The plastic should be selected to have a tensile strength at the forming temperature sufficient to distribute the forming forces. The fiberglass mat or scrim is desirably knitted. This will effectively reinforce the film without jeopardizing the color tones of the color-coated film and without interfering with the forming operation. The reinforcing material serves to distribute the elongating forces produced by the engagement with the most protruding areas of the mold core. Thus, the entire film 10 and color layer 10' is caused to elongate rather than the immediate area of contact. Accordingly, film and color layer thickness remain relatively uniform after the part is formed.

The blank and colored layer may be applied to the mold with robot means or removably adhered to a carrier film strip. The carrier film strip may be provided with means to register the position of the colored blanks relative to the mold half onto which the blanks are to be placed, e.g., edge perforations. The carrier, with the blanks attached, may then be supplied from a roll. Once the blank and mold are juxtaposed, suction is applied to the edge of the blank by the mold, as through channels, sufficient to separate the blank from the carrier strip. Naturally, other transfer means may readily be used.

Naturally, any other convenient or desirable plastic delivery means or molding procedure may conveniently be used while still retaining the advantages of the present invention, as for example alternative compression molding techniques, injection molding or injection blow molding.

Similarly, multiple plastic layers may be deposited on the film-reinforcing material combination. Alternatively, one polymer could be deposited in a designed pattern, and a second or a plurality of second polymers deposited in a designed pattern. This could be done with one or more extruders feeding for example separate channels to deposit a predesigned pattern of multiple resins. As a further alternative, one could sequentially feed polymers of different characteristics to provide designed properties in the finished product.

A significant feature of the present invention is the uniformity of heating of the colored film or blank without having to resort to external means, and the assurance that the forming operation is carried out simultaneously, colored film or blank, reinforcing material and the backing layer, followed by the application of high enough molding pressures to provide mold conformance of all layers. The finish of the film is thereby preserved and optically detectable imperfections and color thinning are avoided. Also, this procedure requires much lower clamping pressure than conventional procedures.

While the foregoing procedure is aimed primarily at application in the exterior of vehicles, it should be noted that there are many other types of components that would benefit from the subject process of molding, as compression molding, with a colored finish and with an accurately molded article, particularly for large household appliances and architectural components. The foregoing produces improved final product, particularly large, panel-like thick parts and eliminates or reduces color thinning and degradation of the film coating. The present invention is useful with any plastic film since it avoids local degradation or thinning of the plastic film.

As a further alternative, one can use co-extrusion for the molten plastic. Plastic from a die may be extruded in co-layers or in multiple passes from two heads to deposit different polymers and/or compositions and/or fillers.

As a still further alternative, one may employ a variety of types of films, as a conductive film (EMI-RFI), a film with UV and/or infrared absorption characteristics, or any desired and convenient film with desired range of properties to achieve particular results.

Thus, in accordance with the present invention, the molded film finish appearance is improved by providing a reinforcement on the inner surface of the film to achieve uniform thinning of the film. In addition, the present invention may improve the strength of the molded part and its impact resistance.

Figure 3:
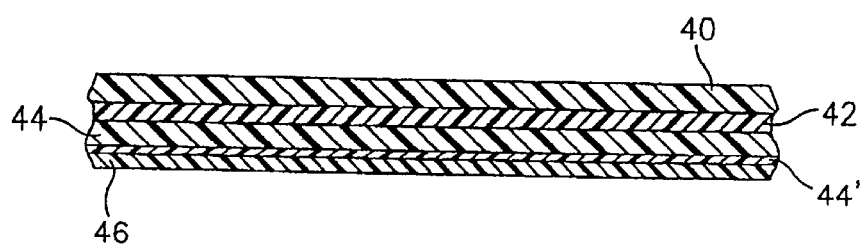
FIGS. 3–6 show further embodiments of the present invention.

In accordance with one embodiment of the present invention, the reinforcing material is adhered to or at least partly embedded in the inside surface of the plastic film, as to a thermoplastic sheet, to form a reinforced sheet. A clear coating, as a plastic coating, may then be applied to the outer surface of the reinforced sheet. The clear coat could be a tinted or translucent surface in order to convey any desired effect in the final product. The resultant product is shown in FIG. 3, wherein the injected or deposited plastic layer 40 is on the inside, followed by reinforcing material 42, which in turn is followed by film 44 and colored layer 44' and with a clear outside coating 46 over film 44. By first at least partly incorporating the reinforcement material into the thermoplastic film sheet intimate saturation and bonding is assured between the reinforcement material and film. Subsequently, in the molding operation, it is only necessary to bond the reinforced film sheet to the molding resin. A base coat/clear coat outside coating may be applied to the colored film sequentially in one process operation or separately in a plurality of process operations. If the reinforcement material is for example a reinforcing fiber scrim, the outside coating will aid in minimizing fibers extending through to the outside of the coated article. Alternatively, the film may be extruded between the reinforcing material and clear outside layer.

High reinforcement loadings and if desired long fiber reinforcement, such as glass fibers, carbon fibers, natural fibers, desirably with fiber lengths of at least 30 mm and possibly of at least 100 mm, may be concentrated where desired in the molded part. In addition, reinforcing material of the present invention, as fibers particularly the aforesaid long fibers, may effectively be included in plastic layer 34. The resulting part may be desirably designed to have rigid, high modulus surface zones and a high impact resistant interior zone.

The resulting molded article with a clear outside coating may be thermoformed to make rigid appliques having excellent dimensional stability.

Further improvement is obtained by the application of registered reinforcement. In registered reinforcement, the reinforcing material is placed to register with the topography of the surface to be molded. The deeper the draw or surface extension, the greater or denser the reinforcement.

Figure 4:
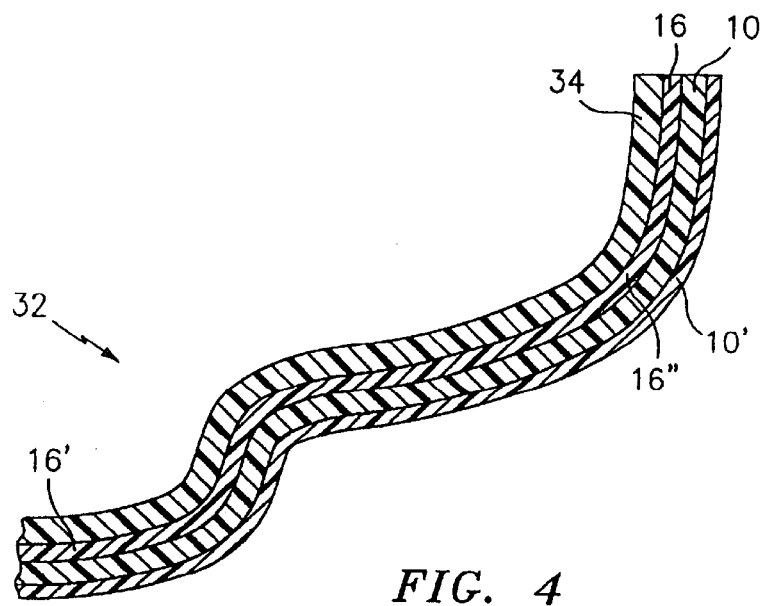

This is shown in FIG. 4 which shows molded article 32 including film 10 and outside colored layer 10', reinforcing material 16 and plastic 34 obtained in accordance with the embodiment of FIG. 1. However, reinforcing material 16 includes a relatively thicker area 16' at the area of deeper draw and a relatively thinner area 16" at the area of more moderate draw. Registered reinforcement may be achieved by any means that restricts stretch of the film finish in areas of greater draw, forcing the finish to stretch more in areas of lesser draw at the molding temperature. Representative examples of reinforcing materials are: woven, braided, knitted or non-woven fibrous material such as glass, synthetic polymers or natural fibers. Alternatively, the reinforcing material may be a compatible (bondable) polymer film that has greater resistance to stretch than the film finish under the molding conditions of temperature and pressure. The reinforcing material may be pre-applied to the film finish by any means, such as with adhesive, static cling, or heat and pressure, to hold it in place and in registry until molding takes place. Alternatively, the reinforcing material may be placed manually or mechanically after the film finish is secured on the mold cavity.

The present invention may desirably use a fiber matte as reinforcing material, which may be woven, non-woven or filament strands, which may be glass, plastic carbon or metal fibers, with the fiber being selected for its cost and performance properties.

Figure 5:
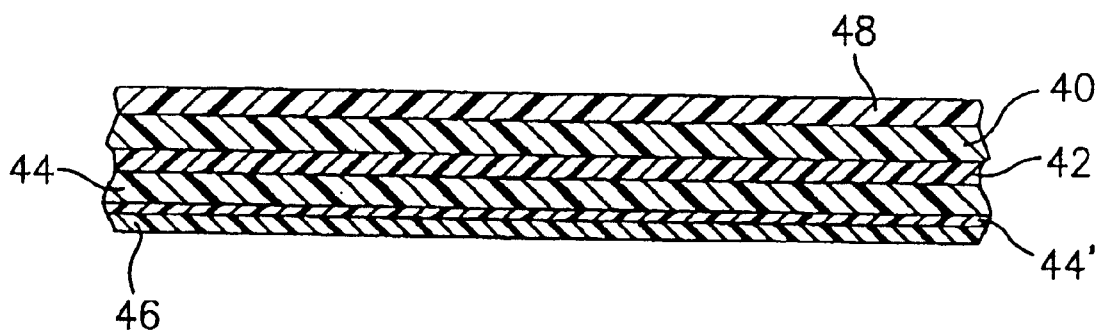

As indicated hereinabove, the reinforcing material (as fibers) may also be applied to the deposited plastic. Reinforcement in one direction is possible by feeding filaments onto the deposited plastic as the die traverses the mold. Alternatively, a reinforcement may be placed on top of the deposited resin, manually or robotically, just prior to clamp closure. Further, the matte may be pre-shaped to the contour of the mold core and placed onto and held on the core prior to closing the mold. Pre-shaping is advantageous in the case of deep draws or severe contours that may create wrinkles in a flat reinforcing sheet. This embodiment is shown in FIG. 5 which includes additional reinforcing material 48 over deposited plastic 40 as shown in FIG. 3.

Figure 6:
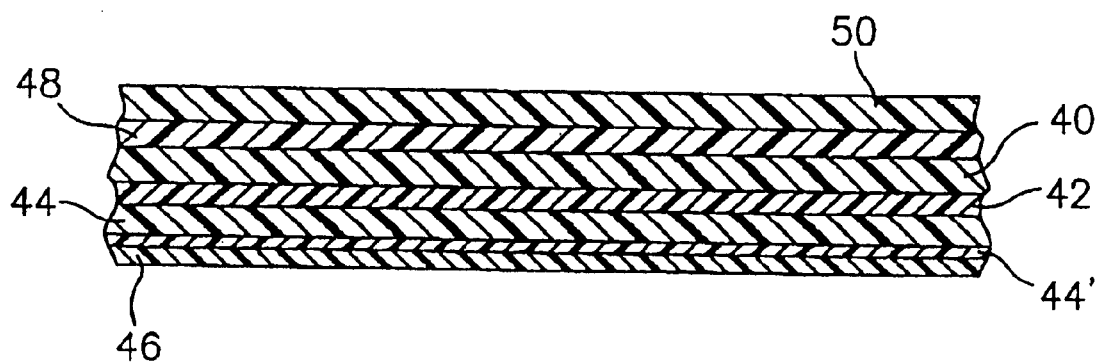

In a further embodiment shown in FIG. 6, a reinforcing material, as a fiber matte 48 may be placed on deposited resin 40 and a second resin deposit 50 made to encapsulate the reinforcing material before the mold is closed.

In a further embodiment, a matte of one description may be placed on the film prior to resin deposit, the resin is then deposited and a second matte of the same or different description may be placed on the hot resin and the clamp closed. The result is an "I-Beam" effect in which the reinforcement is concentrated on two sides of the molding resin.

It is a particular advantage of the present invention that reinforcement in the colored film layer serves to minimize localized thinning of the film due to heat and pressure as the mold closes. The reinforcement causes film to be drawn/pulled from adjacent areas to the area of greatest stretch, thus dissipating the stretch to a greater area and reduction of thinning in the localized area.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A molded plastic article, which comprises:
   a compression molded article made from the following laminate:
   a plastic layer;
   an outer film layer of plastic over said plastic layer and forming a composite laminate therewith, said outer film layer having an inner surface adjacent and bonded to said plastic layer and an outer surface opposed to said inner surface;
   a reinforcing material selected from the group consisting of metal, plastic fibers, carbon fibers, natural fibers, fiberglass, textile and mixtures thereof, wherein said reinforcing material is adhered to the inner surface of said outer film layer and situated between the plastic layer and the outer film layer; and
   a colored, decorative layer on the outer surface of said outer film layer,
   wherein the article is a colored compression molded article having a color change after molding of less than 2 McAdam units and wherein the reinforcing material includes reinforcing fibers of at least about 30 mm long.

2. A molded plastic article, which comprises:
   a compression molded article made from the following laminate:
   a plastic layer;
   an outer film layer of plastic over said plastic layer and forming a composite laminate therewith, said outer film layer having an inner surface adjacent and bonded to said plastic layer and an outer surface opposed to said inner surface;

a reinforcing material selected from the group consisting of metal, plastic fibers, carbon fibers, natural fibers, fiberglass, textile and mixtures thereof, wherein said reinforcing material is adhered to the inner surface of said outer film layer and situated between the plastic layer and the outer film layer; and a colored, decorative layer on the outer surface of said outer film layer, wherein the article is a colored compression molded article having a color change after molding of less than 2 McAdam units and wherein the plastic layer includes reinforcing fibers of at least about 30 mm long.

3. A molded plastic article, which comprises:

a compression molded article made from the following laminate:

a plastic layer;

an outer film layer of plastic over said plastic layer and forming a composite laminate therewith, said outer film layer having an inner surface adjacent and bonded to said plastic layer and an outer surface opposed to said inner surface;

a reinforcing material selected from the group consisting of metal, plastic fibers, carbon fibers, natural fibers, fiberglass, textile and mixtures thereof, wherein said reinforcing material is adhered to the inner surface of said outer film layer and situated between the plastic layer and the outer film layer; and a colored, decorative layer on the outer surface of said outer film layer, wherein the article is a colored compression molded article having a color change after molding of less than 2 McAdam units and including more reinforcing material where the molded article has more surface extension than the reinforcing material where the molded article has less surface extension.

* * * * *